(12) United States Patent
Stobbe et al.

(10) Patent No.: US 6,453,528 B1
(45) Date of Patent: Sep. 24, 2002

(54) DEVICE AND METHOD FOR THE MACHINING OF CRANKSHAFT PINS

(75) Inventors: Detlev Stobbe, Hamburg; Bernhard Wriedt, Travenbrück, both of (DE)

(73) Assignee: Man B&W Diesel Aktiengesellschaft, Augsburg (DE)

( * ) Notice: Subject to any disclaimer, the term of this patent is extended or adjusted under 35 U.S.C. 154(b) by 0 days.

(21) Appl. No.: 09/616,721

(22) Filed: Jul. 14, 2000

(30) Foreign Application Priority Data

Jul. 14, 1999 (DE) .......................................... 199 32 410

(51) Int. Cl.[7] .............................. B23P 23/02; B28B 5/20
(52) U.S. Cl. ......................... 29/33 R; 29/28; 29/27 C; 409/179; 409/199; 82/107; 82/128; 451/70; 451/181
(58) Field of Search ........................ 29/33 R, 28, 27 C; 409/199, 178, 179; 451/70, 181; 82/107, 106, 113, 128

(56) References Cited

U.S. PATENT DOCUMENTS

| | | | | | |
|---|---|---|---|---|---|
| 1,554,611 A | * | 9/1925 | Weydell | ..................... | 82/107 |
| 2,566,660 A | * | 9/1951 | Georgian | ..................... | 82/107 |
| 2,693,066 A | * | 11/1954 | Berstecher | ..................... | 451/24 |
| 2,698,505 A | * | 1/1955 | Marsh | ..................... | 451/441 |
| 2,818,685 A | * | 1/1958 | Becker | ..................... | 29/28 |
| 2,842,238 A | * | 7/1958 | Shaw et al. | ..................... | 409/179 |
| 3,114,279 A | * | 12/1963 | Froussard | ..................... | 82/107 |
| 4,269,552 A | * | 5/1981 | Unigovsky et al. | ..................... | 409/179 |
| 4,538,949 A | * | 9/1985 | Bloch | ..................... | 409/179 |
| 4,609,312 A | * | 9/1986 | Sverdlin | ..................... | 409/199 |
| 5,161,291 A | * | 11/1992 | Guenther | ..................... | 409/178 |

FOREIGN PATENT DOCUMENTS

| | | |
|---|---|---|
| DE | 77 09 500 | 9/1978 |
| DE | 34 34 140 | 1/1986 |

* cited by examiner

Primary Examiner—A. L. Wellington
Assistant Examiner—Erica E Cadugan
(74) Attorney, Agent, or Firm—Cohen, Pontani, Lieberman & Pavane

(57) ABSTRACT

Disclosed is a portable apparatus for the machining of a crankshaft pin of a crankshaft installed in an engine. The apparatus is supported on the crankshaft-web side surfaces and performs economical procedures by turning, milling or grinding. The apparatus and the method applied with it achieve dimensional, shape and positional tolerances and also surface finishes as specified for constructing new crankshafts.

22 Claims, 4 Drawing Sheets

DEVICE AND METHOD FOR THE MACHINING OF CRANKSHAFT PINS

BACKGROUND OF THE INVENTION

The invention relates to a mobile apparatus for the machining of crankshaft pins on crankshafts, and also to a method for machining crankshaft pins using that apparatus.

Devices for the machining of crankshaft pins or journals are generally known. The known apparatus includes those which consists of two divided rotating rings which are provided on the outer circumference with a sprocket-wheel toothed arrangement and are held and guided radially on transition grooves between the crankshaft pins by sliding blocks made of plastic. The drive takes place by means of a motor which is driven by compressed air, via a roller chain which has been placed around one of the rotating rings. The other rotating ring is connected to the driven rotating ring by spacer rods which can be screwed in. The machining of the running surface takes place with the rotating rings revolving, by means of a compressed-air grinding machine which is fitted onto the device and is equipped with a cup wheel. The finish-machining can take place by means of an orbital grinder fitted on the device, or manually by filing or by abrasive-grinding. Subsequently, the transition grooves must be reset using manually guided radial grinding machines driven by compressed air.

Because of the low removal efficiency during grinding, this method is uneconomical, and because of the contamination of the operating area with grinding dust which is detrimental to health, a large outlay for cleaning work is necessary.

The imprecise guiding and the play, which increases with the machining time, in the sliding blocks in the transition grooves means that a large overmeasure must be provided which is finished by complex, manual work and with reduced manufacturing quality and with a high expenditure of time.

The construction of the device and also the alignment on the crankshaft pin are time-consuming. Because a compressed-air hose follows the device and automatically coils up, it is not possible to perform a continuous working sequence, since the direction of rotation of the device must regularly be reversed in order to uncoil the hose.

DE 34 34 140 shows a device which is suspended on a mount and supported on the crankshaft pin by means of rollers or sliding blocks. The device follows the revolving crankshaft pin on account of the mount and is always maintained in a plane-parallel position with respect to the crankshaft central pin by an electronic spirit level. The machining takes place by means of a driven grinding cylinder.

In addition to the above-described disadvantages of the grinding method, in this device there is a risk of inaccuracies during the controlled parallel alignment if vibrations or oscillations occur in the vicinity of the device, and so the manufacturing quality is reduced when used, for example on ships. Furthermore, the main bearings of the crankshaft are stressed by the revolution during the machining and may be damaged.

German Utility Model 77 09 500 discloses a device consisting of a stationary, divisible outer ring which is fastened to the crankshaft web in an axially and radially adjustable manner. Mounted rotatably in this outer ring is a transmission-driven carrier ring which carries an axially displaceable slide on a guide. Fastened to this slide is a cutter for the machining of the crankshaft pin, the cutter being displaced along the running surface by an advancing device.

The construction and the installation of this device are very complicated, and require considerable time to precisely adjust the fixed outer ring.

The object of the invention is to provide a mobile device and a method for the simple, rapid and precise machining of crankshaft pins on crankshafts.

SUMMARY OF THE INVENTION

The above stated object is achieved by the apparatus and method of the invention.

The present invention is in a portable apparatus for surface machining a crankshaft pin having web side surfaces. The apparatus has a moveable tool for machining the surface and inner rings adapted for radial positioning on the crank shaft pin surface which are fixed to the web side surface. The apparatus also includes revolving rotating rings which are guided in the inner rings. The fixing segments attached to the inner rings position the inner rings on the surface.

The machining method applied with the apparatus achieves the dimensional, shape and positional tolerances specified in terms of the design, and also the required surface finish so that only a minimal amount of manual finishing work is required comparable to that required when manufacturing from new.

The particularly advantageous, simple installation and handling of the apparatus provide a considerable time savings for the machining, thereby resulting in an overall increase in the economic efficiency of the machining.

The favorable reduction in the volume of chips generated during the finish-machining means that the yield of grinding dust, which is detrimental to health, is virtually completely eliminated.

In a preferred embodiment, the apparatus is attached without the use of bores, so that after the machining there is no reduction in the strength of the crankshaft due to material being taken away or due to changes in the properties of the material. In particular, reworking of damaged crankshaft pins (for example having hardened surfaces) to a constructionally permissible undersized diameter on crankshafts incorporated in the engine is possible.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

DETAILED DESCRIPTION OF THE PRESENTLY PREFERRED EMBODIMENTS

Figure 1:
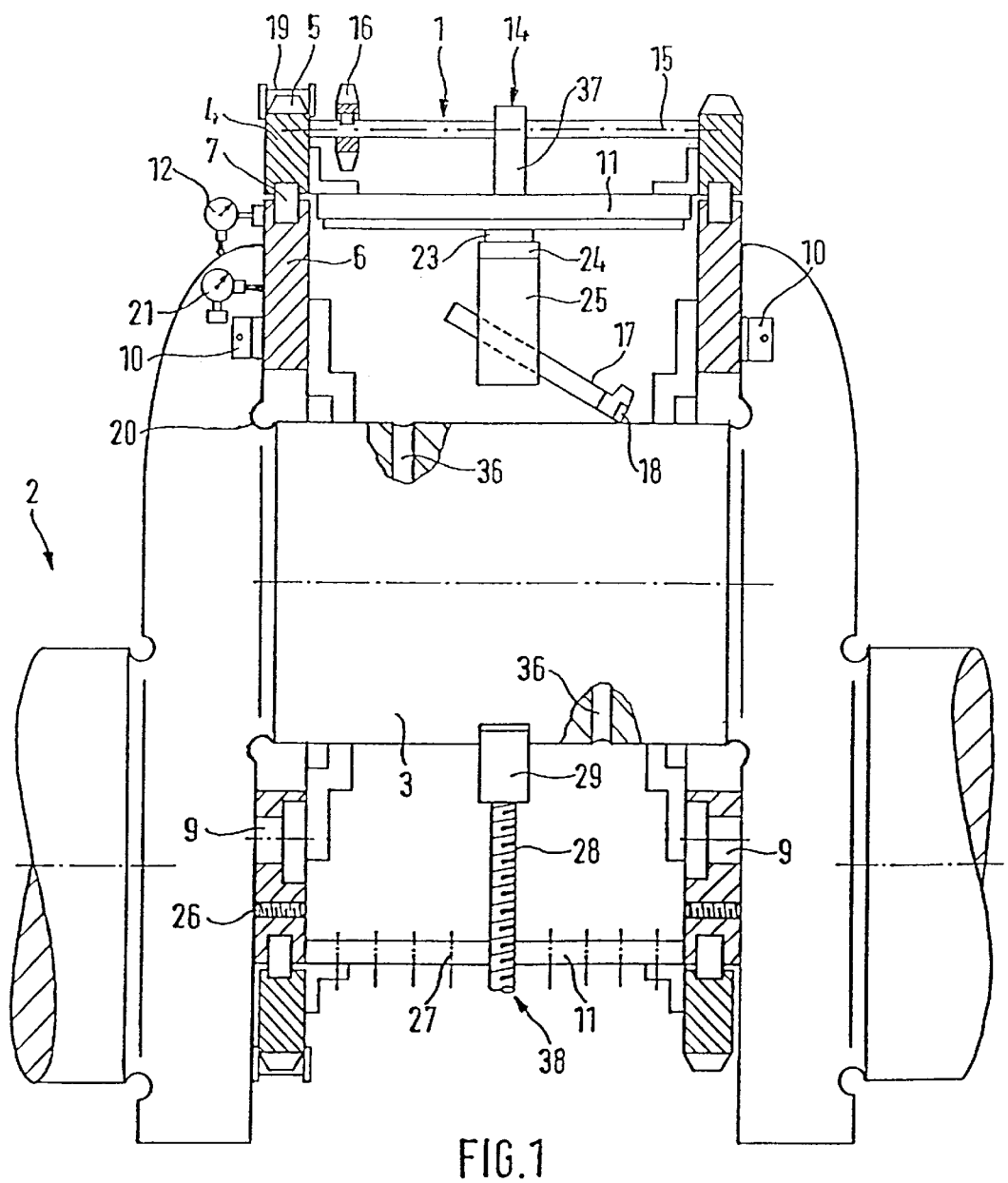
FIG. 1 shows a front view of the apparatus of the invention.

FIG. 1 shows a crankshaft (2) having a crankshaft central journal, which is illustrated in truncated form, and having a crankshaft pin (3) bounded by crankshaft webs. Transition grooves (20) are made at the transitions from the running surface of the crankshaft pin (3) to the crankshaft webs.

Figure 2A:
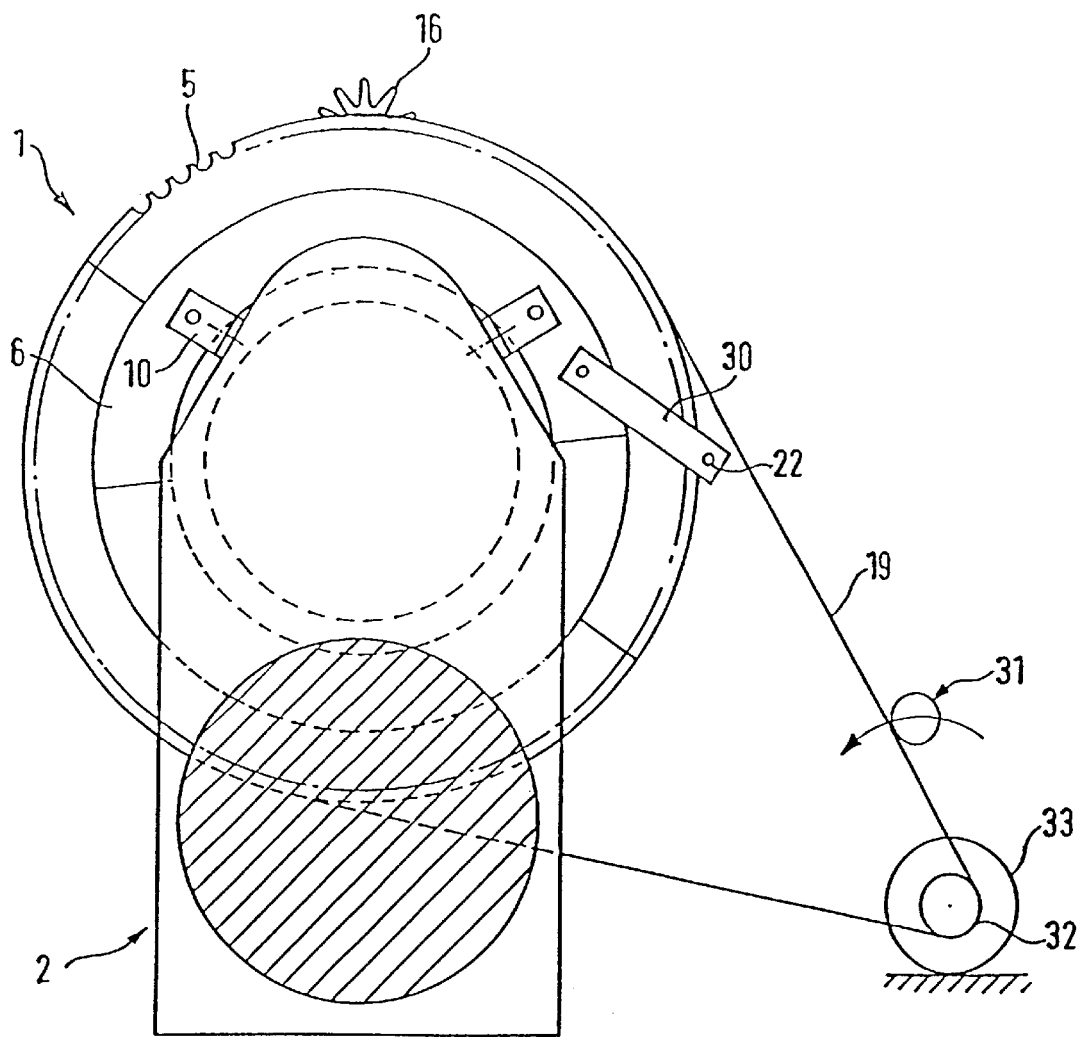
FIG. 2a shows a side view of the apparatus of FIG. 1.
Figure 2B:
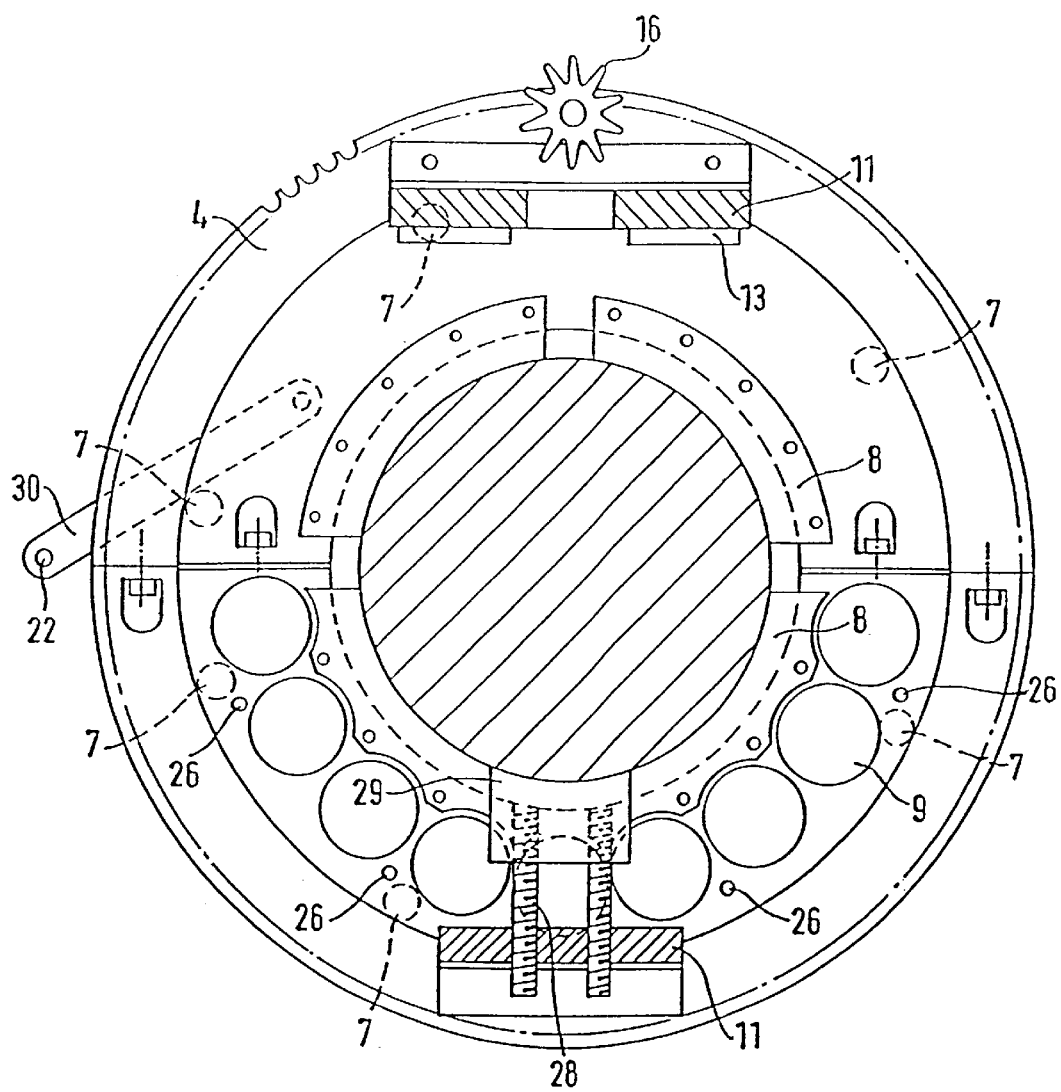
FIG. 2b shows a section through a crankshaft pin of the apparatus of FIG. 1.

The apparatus (1) is carried between two divided inner rings (6) which are positioned concentrically with respect to the crankshaft-pin axis by fixing segments (8) (FIG. 2B). Each of fixing segments (8) has a concave rounding on the surface which is in contact with the running surface of the crankshaft pin (3), the rounding being matched exactly to the running surface. In a preferred embodiment, two fixing segments (8) are releasably screwed to the upper and lower half of the inner rings (6). The rings (6) are fastened to the outer contour of the crankshaft web by support elements (10) (FIG. 2A). When the machining method is carried out, the fixing segments are not removed until that boundary region, which they cover, of the running surface is machined, since up until this point the fixing segments (8) can be used for additional radial fixing. For different pin diameters, corresponding fixing segments (8) having matching roundings have to be produced.

In another preferred embodiment, the inner rings (6) are fixed to the inner side surfaces of the crankshaft webs by means of high-power round magnets (9). Magnets (9) are placed into stepped holes which are situated on a pitch circle for holes on the lower half of the divided inner rings (6) and, with regard to bore diameter, number and diameter of the pitch circle for holes, are optimized so that the magnets exert a maximum adhesive force onto the web side surfaces. Another method of fastening the inner rings (6) makes use of an adhesive which is applied between the inner rings (6) and the web side surfaces. The adhesive connection can be undone, for the purpose of removing the apparatus (1), by a chemical solvent enabling the adhesive to be removed without leaving a residue.

The orthogonal alignment of the inner rings (6) with respect to the crankshaft main axis and the parallel alignment of the two inner rings (6) with respect to each other is by way of a plurality of stud bolts (26) which are screwed into threaded bores on the inner rings (6) and are positioned against the web side surfaces. The apparatus (1) is thereby additionally secured against being displaced radially when the fixing segments (8) are removed.

The position of the two inner rings (6) is checked by means of dial gauges (12, 21). Radial displacement is indicated by a dial gauge (12) which is fastened, for example with a magnetic holder, to that region of the inner ring (6) protruding over the crankshaft web. The tip of the gauge is positioned on the crankshaft-web outer side in the radial direction. An axial change in position is monitored by another dial gauge (21) which is fixed to the crankshaft-web outer surface by means of a magnetic holder or other fastening means. The gauge tip of which is positioned against the protruding region of the inner ring (6) in the axial direction.

A plurality of protruding rollers (7) serving for the play-free guidance of rotating rings (4) placed on them are embedded on the circumferential surfaces of the inner rings (6). For this purpose, use is preferably made of commercially available grooved ball bearings which take over both the function of a play-free mounting on rolling bearings and also the guidance on their outer ring. The rollers (7) are mounted unevenly split around the outer circumference of the inner rings (6) in order to avoid a situation in which the opposed jottings of the divided rotating rings (4) run at the same time over opposite rollers (7). The rollers (7) enable the rotating rings (4) to be guided in a play-free manner both in the axial direction and in the radial direction.

Sealing elements, not shown in more detail, are provided between the inner rings (6) and the rotating rings (4) in order to protect the rollers (7) from contamination.

The rotating rings (4) which are present on both sides are connected to one another by spacer plates (11), and the drive for the rotational movement takes place by means of a roller chain (19) which has been placed over the integral toothed arrangement (5). This toothed arrangement (5) may also be situated on an additional ring which is pressed by the rotating rings (4).

The spacer plates (11) which are circumferentially opposite one another are in each case screwed to the rotating rings (4) with angle sections.

An advancing device (14) is installed on one of the preferably two spacer plates (11), the advancing device being moved along the axis of the crankshaft pin (3) by means of a spindle (15). In a preferred embodiment, the spindle (15) is a threaded spindle which is mounted at its two ends in a rotatable, but axially fixed manner, in the rotating rings (4). Mounted on the spindle (15) at a small distance from one rotating ring (4) is a star-shaped driver (16) which, once per revolution of the rotating rings (4), meshes with an advancing finger (22), which is fastened to the corresponding inner ring (6), resulting in the spindle (15) being rotated through an adjustable angle.

Interacting with the spindle (15) is a spindle nut which is placed into an advancing element (37). The advancing element (37) protrudes through an aperture on the spacer plate (11), the aperture extending over the entire displacement path, and is connected to a plate (24). The plate (24) is guided by means of slides (23) in a play-free manner on linear guides (13) which are fastened to both sides of the aperture on the spacer plate (11) along the displacement path. The linear guides (13) are preferably mounted on the lower side, i.e. on that side of the spacer plate (11) which faces the running surface to be machined. Fastened to the plate (24) is a holder (25) which carries an adjusting element (17). The main axis of the adjusting element (17) is preferably aligned at an angle of 30° with respect to the rotational axis of the crankshaft pin (3). However, this position of the adjusting element (17) may also assume another angle of between approximately 0 and 90°. In a preferred embodiment, a commercially available fine-hole collet having adjusting rates of, for example 0.01 mm , is provided as the adjusting element (17). A cutting material (18) with which the rotational machining is undertaken is fastened to the adjusting element (17). Suitable cutting materials (18) include reversible cutting tips, lathe tools and the like made of super-speed steel, hard metal or ceramic cutting materials.

A compressed-air grinding machine, as is known from the prior art, or a milling device having a driven milling tool, for example an inserted-tooth face-milling cutter, may also be attached to the holder (25).

These grinding or milling devices may also be fastened directly to a spacer plate (11), and in this design, after finishing a machining circuit on the circumference of the crankshaft-pin running surface, have to be offset in the axial direction to machine a further circuit. These devices can be fastened in the same manner as for the illustrated abrasive-grinding device (38).

The abrasive-grinding device (38) consists of a shaped block (29) having, on an engagement surface, a concave shape which is matched to the cylindrical surface of the crankshaft pin (3). The engagement surface is covered by abrasive-grinding cloths or similar materials, as are customary for surface finishes. The shaped block (29) is connected to the spacer plate (11) by threaded rods (28) which are screwed into the plate. The positioning pressure of the shaped block (29) against the running surface can therefore be adjusted, which influences the removal of the material. Spacer plate 11 has bores (27) to receive the threaded rods, the bores being situated on lines along the crankshaft-journal axis and enabling the shaped block (29) to be offset over the entire width of the running surface of the crankshaft pin (3).

FIGS. 2a and 2b show apparatus (1) in side views. The arrangement of the fixing segments (8) on the inner rings (6) and also their bearing against the running surface of the crankshaft pin (3) can be seen. Furthermore, the joining points and screw connections for connecting the two halves of the inner rings (6) and the rotating rings (4) are illustrated. The rollers (7) are shown by dashed lines, as an illustration of concealed edges, in order to clarify the unevenly split arrangement of the rollers (7) around the circumference of the inner rings (6). The advancing finger (22) is positioned approximately on the horizontal central plane of the apparatus (1) and can be offset by the mount (30) which is fastened—partially concealed by the rings (4, 6)—to the inner ring (6).

The arrangement of the stud bolts (26) which are provided for the parallel alignment of the inner rings (6) can likewise be seen in this view.

The spacer plates (11) which revolve together with the rotating rings (4) are illustrated in a cut-off manner, with only the linear guides (13) and the aperture for the advancing element (37) being visible on the spacer plate (11) illustrated at the top. There can be seen on the spacer plate (11) shown at the bottom, as also on the upper one, the front view of the fastening angle and the threaded rods (28) for fastening the shaped block (29) which bears with its concave shape against the crankshaft pin (3).

The revolving movement is driven by a motor (33) by means of the roller chain (19) which is wrapped around the toothed arrangement (5) of the one rotating ring (4). This motor is preferably operated by compressed air and has an interchangeable ratio of transmission to the chain pinion (32) which, for the purpose of tensioning the roller chain (19), is fastened in a longitudinally displaceable manner independently of apparatus (1). Electric motors or other drives can also be used. The drive can take place both on the left-hand or right-hand rotating ring (4) as in FIG. 1 or else simultaneously on both rotating rings (4) by means of two drive units (33, 32, 19, 5).

In order to dampen any transverse oscillations which occur on the roller chain (19) and/or in order to pre-tension the roller chain, a tensioning device (31) acting together with damping means may be provided.

A decided advantage is that the apparatus and method of the invention can be applied to a crankshaft installed in an engine.

Figure 3:
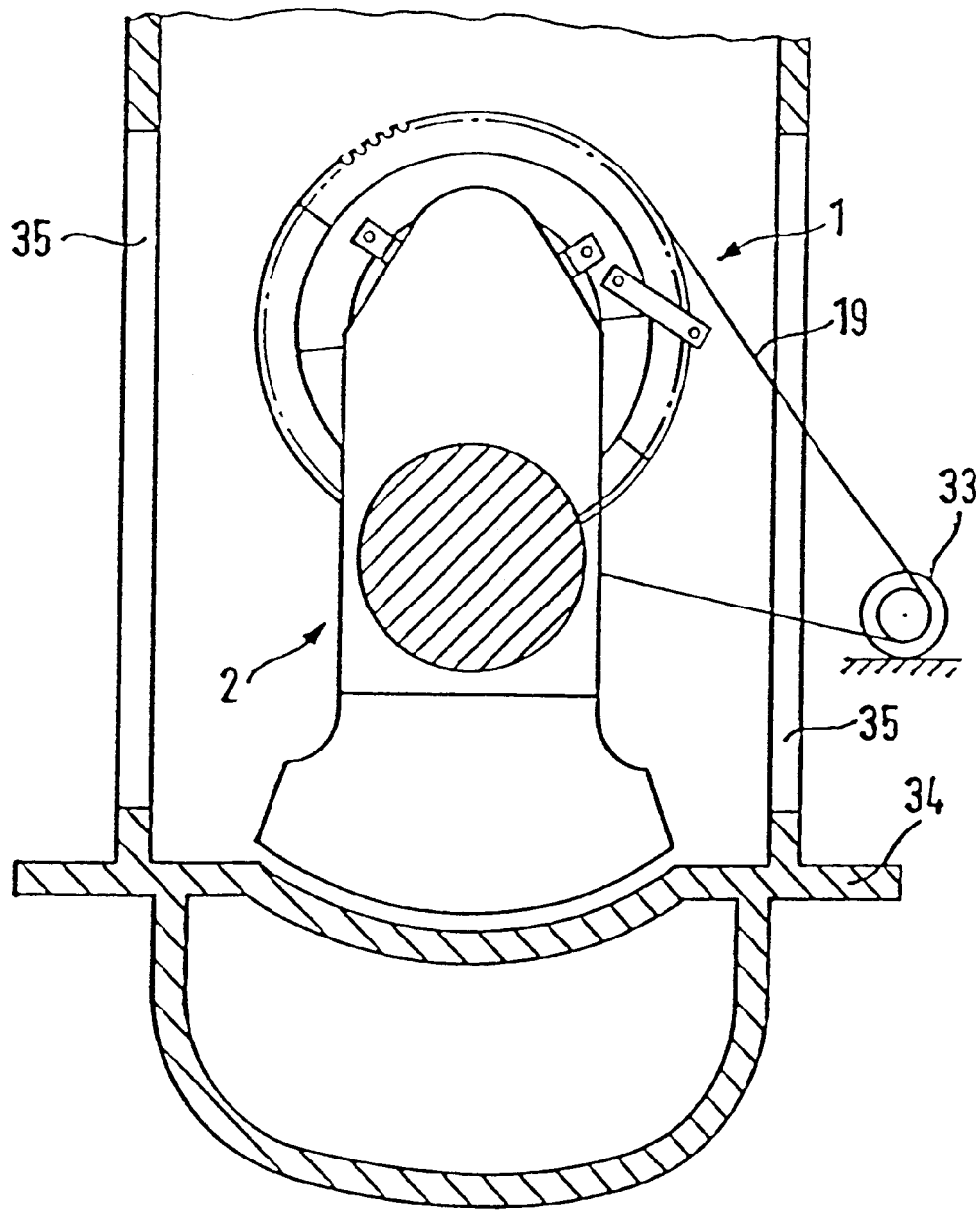
FIG. 3 shows the application of the apparatus according to FIGS. 1 and 2 on a crankshaft installed in an engine.

The application of the mobile apparatus (1) to a crankshaft (2) incorporated in the engine frame (34) of an internal combustion engine can be understood by reference to FIG. 3.

A truncated illustration shows an engine frame (34) which is connected at the base of its insertion point, for example, to a ship's hull or in the engine room of a power station. The coverings of the openings (35), which are situated along the cylinder in the regions of the crankshaft pins, have been removed.

The motor (33) for the drive of the apparatus (1) is fastened outside the engine frame (34) on an installation rack, not shown, and drives the apparatus by the roller chain (19).

Illustration of the main bearings of the crankshaft (2) and of all other internal combustion engine parts which are not relevant to the invention has been omitted.

In the machining of crankshaft pin (3), those halves of the inner rings (6) on the crankshaft pin (3) which are provided with the fixing segments (8) are screwed to one another, are aligned and are fixed to the respective web side surface. The halves of the rotating rings (4) then are placed onto the inner rings (6) and likewise screwed fixedly to one another. In the process, the spindle (15) and the spacer plate (11) are already inserted together with the advancing unit (14) but only after their alignment are they fixed to the rotating rings (4) which are already screwed in. A further spacer plate (11) is initially mounted without the abrasive-grinding device (38). After the drive (19, 32, 33, 31) is mounted, the machining of the running surface of the crankshaft pin (3) can be started. The cutting material (18) is fed to a bore (36) in the crankshaft pin (3), the bore serving to supply lubricant. The apparatus (1) is then set into operation and the running surface is machined starting from the bore (36) in the one axial direction until in the vicinity of the fixing segments (8). Subsequently, the holder (25) is turned through 180° on the plate (24) and the running surface is machined starting from the same bore in the other axial direction in the same way as described above.

In order to machine the boundary regions of the running surface of the crankshaft pin (3) the fixing segments (8) are removed and the machining takes place starting from a bore (36) in the vicinity of the boundary, in the same manner as described above.

After the rotational machining there is still an overmeasure of a few $1/100$ millimeters on the running surface which is finish-machined by the abrasive-grinding device (38). For this purpose, the shaped block (29) which is provided with abrasive-grinding materials is positioned against the running surface and moved over the running surface by the apparatus (1). In order to machine the entire running surface in its axial extent, the shaped block (29) has to be offset in the axial direction by approximately its own width. This takes place by means of the threaded rods (28) which are screwed into the corresponding bores (27) which are mounted in an axially offset manner. The machining therefore takes place stepwise in circuits.

Finally, the transition grooves (20) on both sides of the running surface are reset by a shaping tool preferably being mounted on the holder (25) or on the adjusting element (17). The transition grooves (20) are then machined by stepwise adjustment of the shaping tool. The shaping tool can also consist of a plurality of shaped segments which are positioned and adjusted at the corresponding locations of the transition grooves (20).

The final finish-machining of the transition grooves (20) takes place manually, once the apparatus (1) has been removed, as is also customary in the case of new constructions, but they can also be machined with the apparatus (1) by means of a grinding machine which is mounted on one of the spacer plates (11) and is operated by compressed air or electrically.

In order to carry out the machining methods, the apparatus of the invention can be mounted both on crankshafts which are incorporated into in-line engines and into V-engines, or else on removed crankshafts.

To apply the apparatus of the invention to different crankshafts of different types of engines, the apparatus can be adapted to the differing dimensions by interchanging the spacer plate (11) with the linear guide (13), and also the spindle (15), the spacer plate (11) with the bores (27), and the fixing segments (8).

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. A portable apparatus for surface machining a crankshaft pin surface on a radius from a central axis of the crankshaft pin, said surface being bounded by crankshaft webs, each said web having a radially-extending inner side surface, said apparatus comprising:

an axially movable tool for rotationally machining said crankshaft pin surface;

inner rings each having means for fixing a respective said inner ring to a respective said inner side surface;

revolving rotating rings each guided on a respective said inner ring, said rotating rings carrying said axially moveable tool therebetween; and fixing segments attached to each said inner ring for positioning said inner rings radially with respect to said crankshaft pin surface.

2. The apparatus of claim 1, wherein the inner radial position of the inner rings is adjustable with respect to the crankshaft pin surface by means of said fixing segments.

3. The apparatus of claim 1, wherein the fixing segments are removably attached to said inner rings.

4. The apparatus of claim 1, wherein the inner rings are fixed to the web side surfaces of the crankshaft pin by magnets.

5. The apparatus of claim 1, wherein the inner rings are fixed to the web inner side surfaces by a chemically soluble adhesive.

6. The apparatus of claim 1, wherein each crankshaft web has an outer contour and the inner rings are each fastened to a respective said outer contour by supporting elements.

7. The apparatus of claim 1, wherein the inner rings are aligned parallel to one another by means of stud bolts positioned against the crankshaft-web side surfaces.

8. The apparatus of claim 1, wherein the rotating rings are fixed with respect to one another by spacer plates.

9. The apparatus of claim 8, further comprising an advancing unit on at least one of the spacer plates, the advancing unit displacing the tool axially by means of a spindle which, with each full revolution of the rotating rings, is rotated further by means of a fixed advancing finger.

10. The apparatus of claim 9, further comprising cutting material attached to the movable tool for the rotational machining.

11. The apparatus of claim 10, further comprising an adjusting element for positioning the cutting material wherein in the adjusting element is a fine-hole collet having a main axis at an angle of between approximately 0 and 90° with respect to the rotational axis of the crankshaft pin.

12. The apparatus of claim 8, wherein a milling device which can be offset in the axial direction is provided on at least one of the spacer plates, for rotational milling.

13. The apparatus of claim 8, further comprising a driven grinding machine attached to at least one of the spacer plates.

14. The apparatus of claim 8, wherein an abrasive-grinding device which can be offset in the axial direction is provided on at least one of the spacer plates.

15. The apparatus of claim 1, further comprising dial gauges for checking the axial and radial position of the inner rings.

16. The apparatus of claim 1, wherein the rotating rings are driven by a pneumatic or electric motor by means of a pre-tensioned roller chain.

17. The apparatus of claim 1, wherein the rotating rings are guided by rollers which have rolling bearings and are distributed unevenly around the circumference of the inner rings.

18. A method of machining a crankshaft pin surface having a central axis being bounded by crankshaft webs, each said web having an inner side surface which is separated from the pin surface by a transition groove, said method comprising providing a portable surface machining apparatus comprising axially moveable tool for machining said crankshaft pin surface, inner rings which can be fixed to the inner side surface via a means for fixing, revolving rotating rings which are guided on said inner rings, and fixing segments attached to each said inner ring for positioning said inner rings radially on the crankshaft pin surface, positioning the machining apparatus on the pin surface using the fixing segments, fixing the inner rings to the inner side surfaces using the means for fixing, rough turning the pin surface using the apparatus, removing the fixing segments, rough turning boundary regions of the pins surface using the apparatus, finish machining the pin surface using the apparatus, and machining the transition grooves using the apparatus.

19. The method of claim 18 further comprising manually finish-machining the transition grooves.

20. The method of claim 18 further comprising finish-machining the transition grooves using an abrasive grinding device.

21. The method of claim 18 wherein the apparatus comprises a driven milling tool which is used for rough turning the pin surface.

22. The method of claim 18 wherein said crankshaft pin surface and said grooves are machined while the crankshaft is in situ in an engine.

* * * * *